US009014642B2

(12) United States Patent
Ito

(10) Patent No.: US 9,014,642 B2
(45) Date of Patent: Apr. 21, 2015

(54) RADIO WAVE RECEIVING APPARATUS FOR RECEIVING TWO DIFFERENT RADIO WAVE INTENSITIES

(71) Applicant: Kyocera Corporation, Kyoto (JP)

(72) Inventor: Tsurumi Ito, Gifu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/623,809

(22) Filed: Sep. 20, 2012

(65) Prior Publication Data

US 2013/0023224 A1  Jan. 24, 2013

Related U.S. Application Data

(63) Continuation of application No. 12/939,979, filed on Nov. 4, 2010, now Pat. No. 8,290,444, which is a continuation of application No. 10/558,019, filed as application No. PCT/JP2004/006728 on May 19, 2004, now Pat. No. 7,853,275.

(30) Foreign Application Priority Data

May 27, 2003 (JP) ................................. 2003-148842

(51) Int. Cl.
*H04B 17/00* (2006.01)
*H04M 1/725* (2006.01)

(52) U.S. Cl.
CPC ................................ *H04M 1/72519* (2013.01)

(58) Field of Classification Search
USPC ............ 455/574, 466, 67.7, 702, 66.1, 67.11, 455/67.13, 115.3, 154.1, 154.2; 342/179
See application file for complete search history.

(56) References Cited

U.S. PATENT DOCUMENTS 5,355,527 A * 10/1994 Owaki ....................... 455/186.2
(Continued)

FOREIGN PATENT DOCUMENTS

JP    11-150765     6/1999
JP    2000-278761   10/2000
(Continued)

OTHER PUBLICATIONS

Japanese Office Action dated Nov. 6, 2007, Application No. 2003-148842.
(Continued)

*Primary Examiner* — Charles Appiah
*Assistant Examiner* — Jaime Holliday
(74) *Attorney, Agent, or Firm* — Duane Morris LLP

(57) ABSTRACT

A radio wave receiver that receives two different sets of radio waves and displays intensity of the received radio waves. First and second radio wave processing portions receive respective radio waves and output various kinds of information, such as video information and audio information. A switching portion receives output signals from the first and second radio wave processing portions, and switches the output signals according to a switching instruction of a controller to supply the output signals to a display portion and a speaker. The controller causes the intensities of the received radio waves in respective tuners of the first and second radio wave processing portions to be displayed simultaneously or in a switching manner based on a user's operation irrespective of which tuner's received radio waves are being processed.

8 Claims, 8 Drawing Sheets

(56) References Cited

U.S. PATENT DOCUMENTS

| | | | |
|---|---|---|---|
| 6,006,089 A * | 12/1999 | Sasaki et al. | 455/423 |
| 6,148,180 A | 11/2000 | Sato | |
| 6,369,850 B1 | 4/2002 | Tanaka | |
| 6,999,438 B2 * | 2/2006 | Nounin et al. | 370/332 |
| 7,020,096 B2 | 3/2006 | Kurihara et al. | |
| 7,076,274 B2 * | 7/2006 | Jollota et al. | 455/561 |
| 7,483,984 B1 * | 1/2009 | Jonker et al. | 709/226 |
| 2004/0152419 A1 | 8/2004 | Lee | |
| 2004/0224719 A1 | 11/2004 | Nounin et al. | |

FOREIGN PATENT DOCUMENTS

| | | |
|---|---|---|
| JP | 2001-127850 | 5/2001 |
| JP | 2001-177870 | 6/2001 |
| JP | 2003-087857 | 3/2003 |

OTHER PUBLICATIONS

Translation of the International Preliminary Report on Patentability of International Application No. PCT/JP2004/006728, with Form PCT/IB373 and Form PCT/ISA/237, Dec. 9, 2004.

* cited by examiner

RADIO WAVE RECEIVING APPARATUS FOR RECEIVING TWO DIFFERENT RADIO WAVE INTENSITIES

CROSS-REFERENCE TO RELATED APPLICATIONS

This application is a continuation of U.S. patent application Ser. No. 12/939,979, filed on Nov. 4, 2010, which is a continuation of U.S. patent application Ser. No. 10/558,019 which adopts the International Filing Date of May 19, 2004, which is a U.S. National Phase of PCT/JP2004/006728 filed May 19, 2004 which claims priority to Japanese Patent Application No. 2003-148842 filed May 27, 2003. The disclosures of these applications are incorporated herein by reference in their entirety.

TECHNICAL FIELD

The present invention relates to a radio wave receiving apparatus for receiving two different radio waves.

BACKGROUND ART

From the past, intensity of a received radio wave (also referred to as a reception level, an antenna level, etc.) is displayed on a liquid crystal display portion, etc., in an electronics apparatus such as a portable telephone, etc. (see Japanese Patent Laying-open H11-150765). Furthermore, due to a reason that a reception processing circuit is downsized and performs very highly in recent years, it becomes possible to provide an apparatus capable of receiving two different kinds of radio waves. In such the apparatus, too, it is possible to display the intensity of the received radio wave on the liquid crystal display portion, etc.

BRIEF DESCRIPTIONS OF THE DRAWINGS

Figure 4:
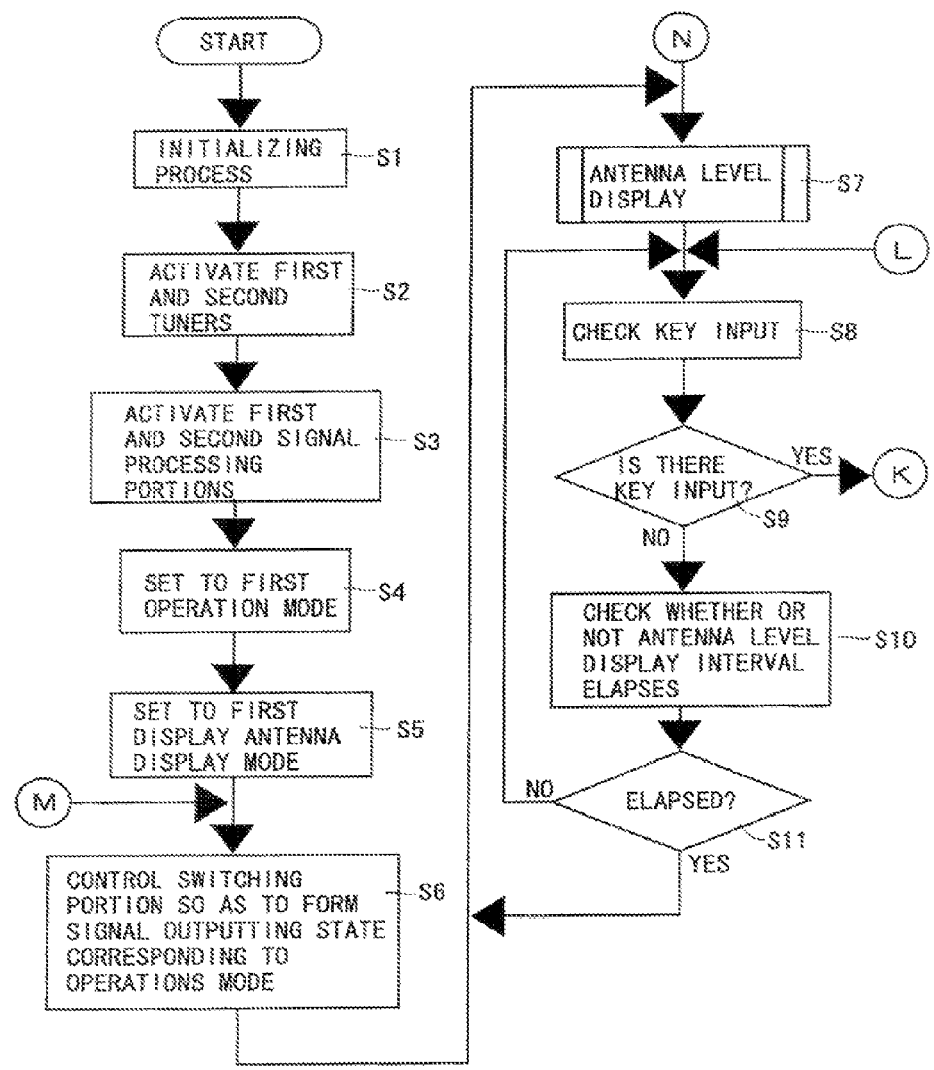
Figure 5:
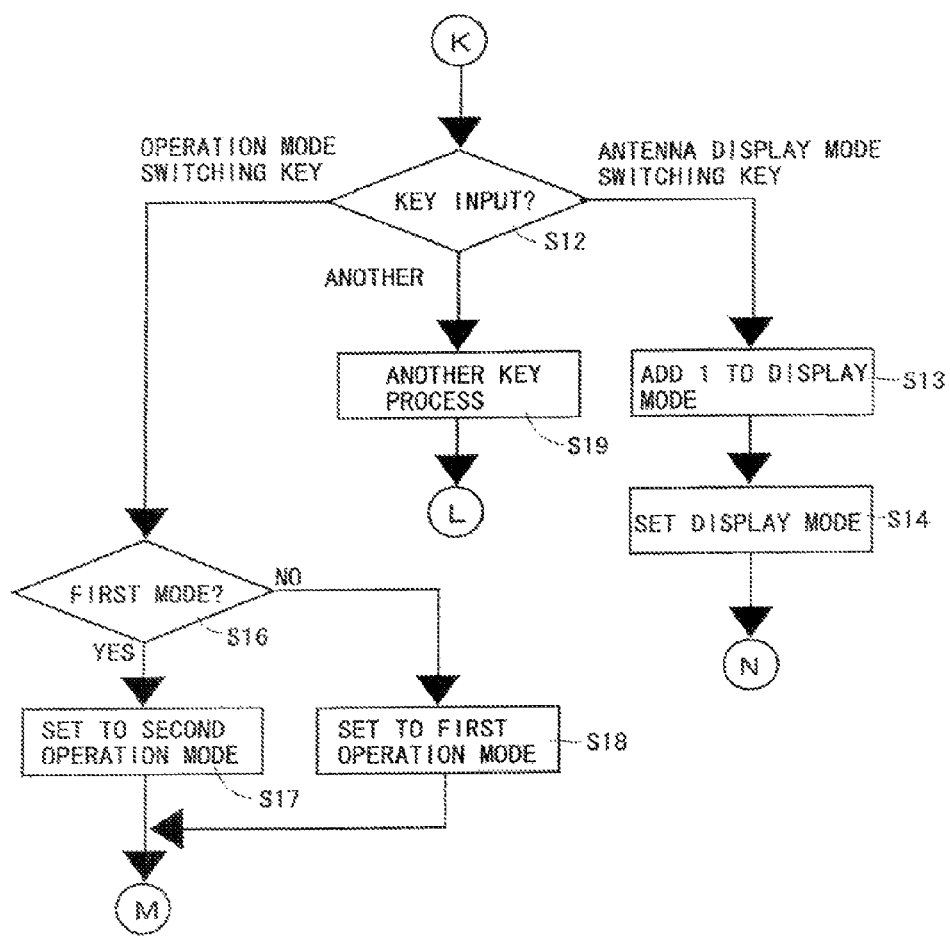
Figure 6:
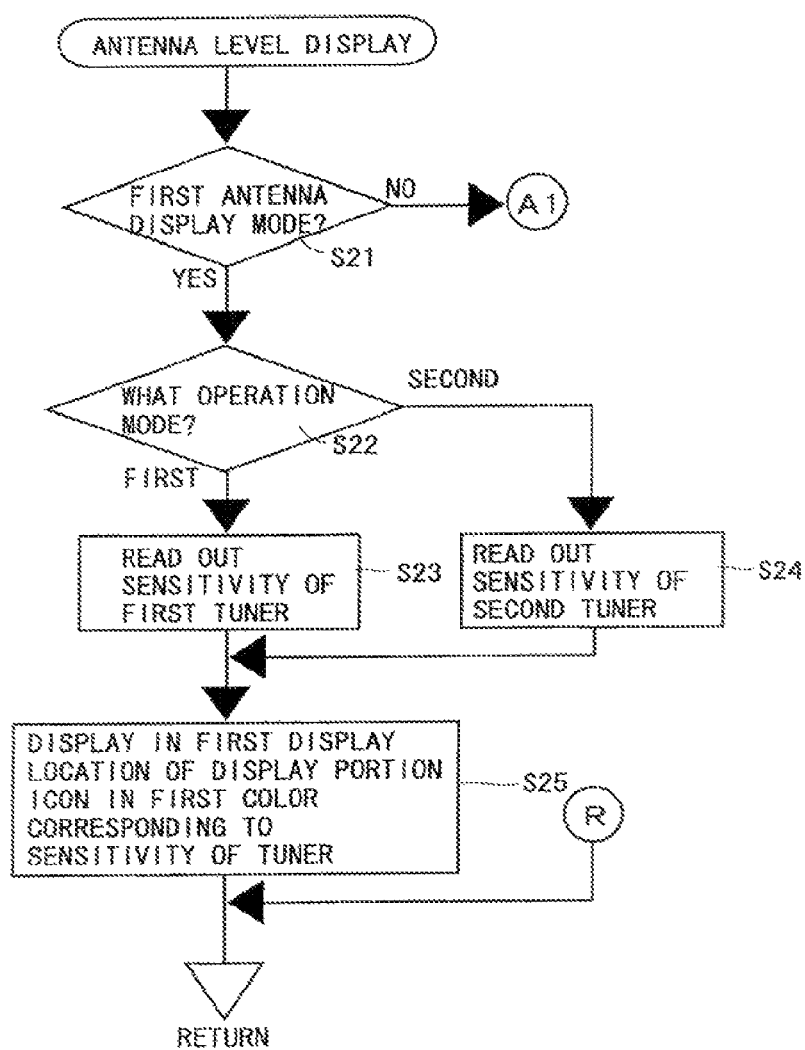
Figure 7:
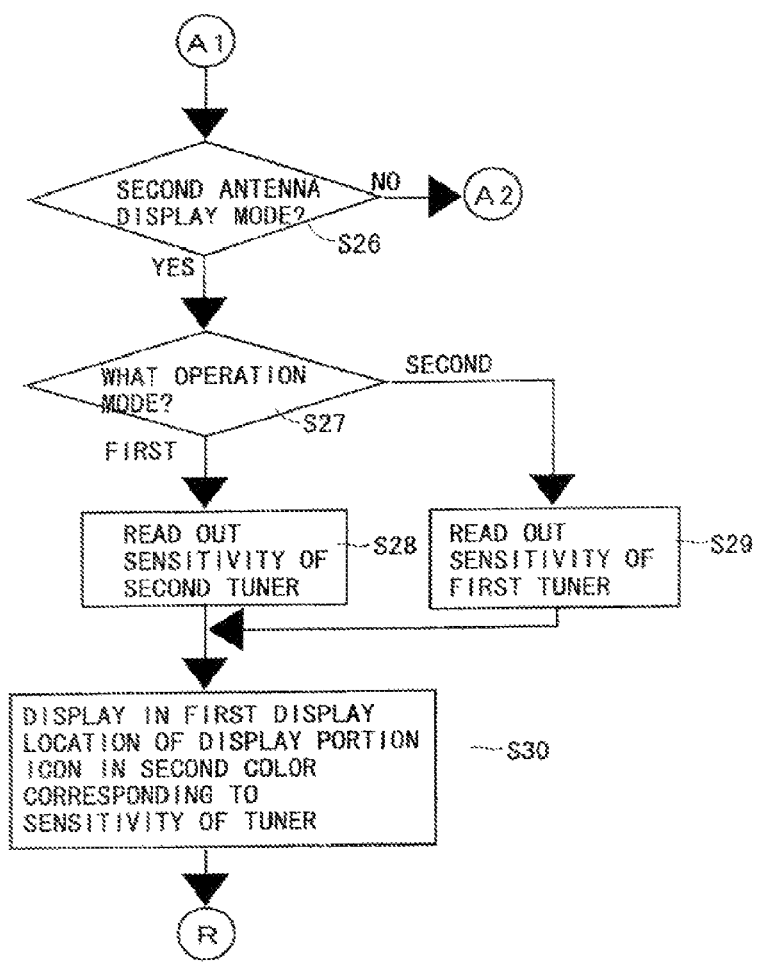

FIGS. 3(a), (b), and (c) are descriptive diagrams each of which shows a display state in each antenna level display mode;

FIG. 4 is a flowchart showing a process content of a control portion;

FIG. 5 is a flowchart showing a process content of the control portion;

FIG. 6 is a flowchart showing a process content of the control portion;

FIG. 7 is a flowchart showing a process content of the control portion; and

Figure 8:
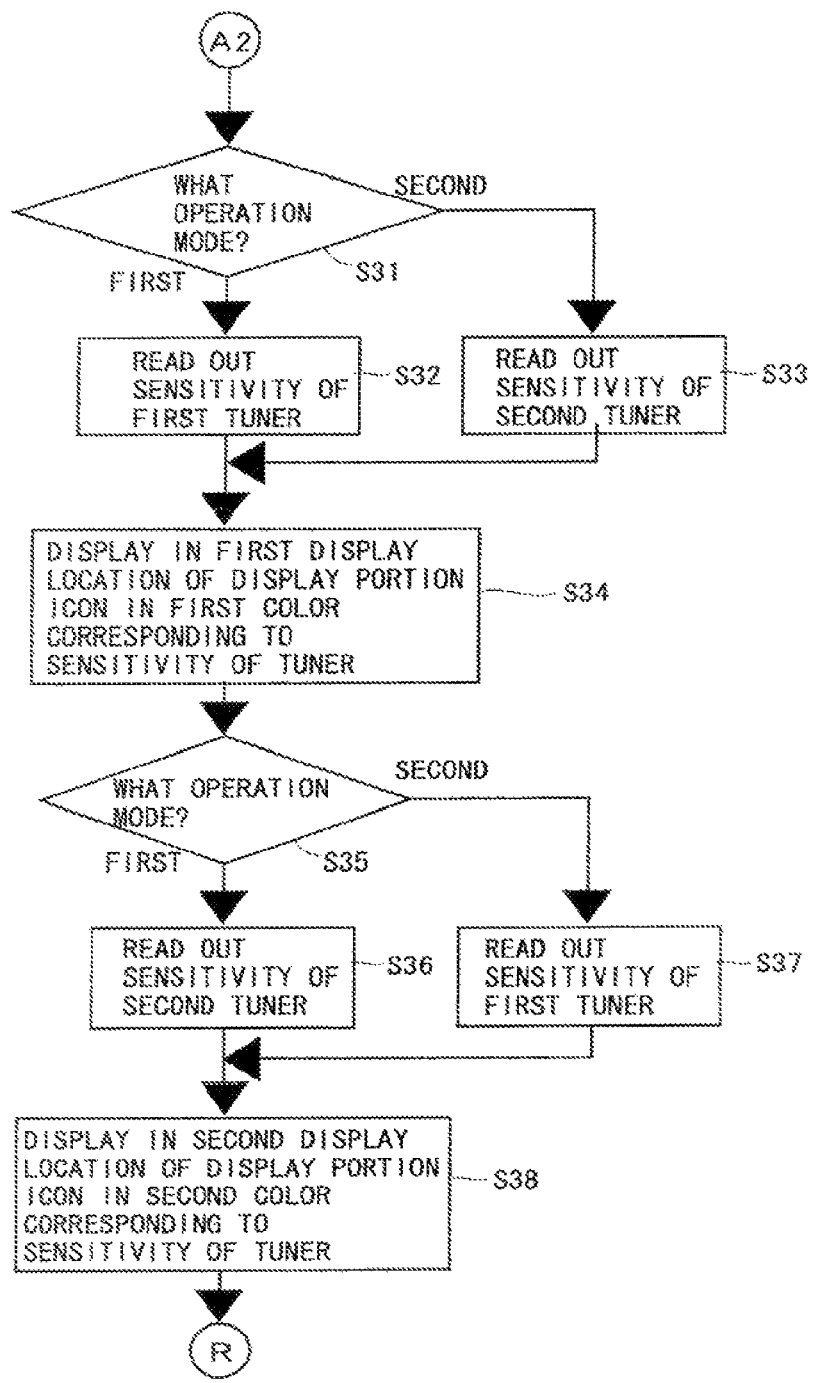

FIG. 8 is a flowchart showing a process content of the control portion.

DETAILED DESCRIPTION OF EXEMPLARY EMBODIMENTS OF THE INVENTION

Problems To Be Solved By The Invention

However, in the conventional apparatus, the intensity of the received radio wave, which is a subject to be processed (a received radio wave in a first operation mode, for example), in use for outputting audio, for example, is displayed on the liquid crystal display portion, etc., out of the two different kinds of the radio waves. Therefore, it is needed to switch the operation mode in order to know the intensity of the other received radio wave (a received radio wave in a second operation mode), and thus, the conventional apparatus lacks user-friendliness.

In view of the above circumstance, an object of the present invention is to provide a radio wave receiving apparatus configured to be capable of utilizing two different kinds of radio waves and capable of enhancing user-friendliness regarding a display of intensity of the received radio waves.

Means For Solving The Problems

In order to solve the above-described problem, a radio wave receiving apparatus of the present invention is a radio wave receiving apparatus provided with a first radio wave receiving portion and a second radio wave receiving portion, and receiving two different radio waves, and comprises a means for obtaining information indicating intensity of received radio waves from each radio wave receiving portion, a display for displaying the intensity of the received radio waves, a means for generating display information applied to the display based on the information indicating the intensity, and a controller for switching, based on an user operation, between a display of the intensity of the received radio wave of the radio wave receiving portions receiving a radio wave, which is a subject to be processed, and a display of the intensity of the received radio wave of the radio wave receiving portion receiving a radio wave, which is a subject not to be processed.

According to the above configuration, it is possible for a user to know the intensity of the preferred received radio wave, whether the received radio wave is a subject to be processed or a subject not to be processed.

A radio wave receiving apparatus is a radio wave receiving apparatus provided with a first radio wave receiving portion and a second radio wave receiving portion, and receiving two different radio waves, and comprises a means for obtaining information indicating intensity of received radio waves from each radio wave receiving portion, a display for display intensity of the two received radio waves at the same time, and a means for generating two pieces of display information applied to the display based on information indicating intensity of the both received radio waves of the radio wave receiving portion receiving a radio wave, which is a subject to be processed, and the radio wave receiving portion receiving a radio wave, which is a subject not to be processed.

According to the above-described configuration, it is possible for a user to know the intensity of the both received radio waves, whether the received radio wave is a subject to be processed or a subject not to be processed.

Furthermore, a radio wave receiving apparatus of the present invention is a radio wave receiving apparatus provided with a first radio wave receiving portion and a second radio wave receiving portion, and receiving two different radio waves, and comprises a means for obtaining information indicating intensity of received radio waves from each radio wave receiving portion, a display capable of forming a display state showing the intensity of two received radio waves at the same time, and a display state showing the intensity of one received radio wave, a means for generating display information applied to the display based on the information indicating the intensity, and a controller for switching, based on a user operation, among a first display mode indicating intensity of the received radio wave of the radio wave receiving portion receiving a radio wave, which is a subject to be processed, a second display mode indicating intensity of the received radio wave of the radio wave receiving portion receiving a radio wave, which is a subject not to be processed, and a third display mode indicating intensity of the both received radio waves.

According to the above-described configuration, it is possible for a user to know the intensity of the preferred received radio wave, whether the received radio wave is a subject to be processed or a subject not to be processed, and in addition, it is also possible for the user to know intensity of the both received radio waves at the same time.

The display indicating the intensity of the received radio waves may be performed by using pictographic characters. Furthermore, there may be a difference in color between the pictographic characters indicating the intensity of the radio wave of the radio wave receiving portion receiving the radio wave, which is a subject to be processed, and the pictographic characters indicating the intensity of the radio wave of the radio wave receiving portion receiving the radio wave, which is a subject not to be processed. In addition, there may be a difference in shape between the pictographic characters indicating the intensity of the radio wave of the radio wave receiving portion receiving the radio wave, which is a subject to be processed, and the pictographic characters indicating the intensity of the radio wave of the radio wave receiving portion receiving the radio wave, which is a subject not to be processed.

Effect Of The Invention

As described above, according to the present invention, it is possible to enhance user-friendliness regarding a display of the intensity of the received radio waves in a configuration capable of utilizing two different radio waves.

Best Mode For Practicing The Invention

Hereinafter, an embodiment of the present invention will be described based on FIG. 1 to FIG. 8.

Figure 1:
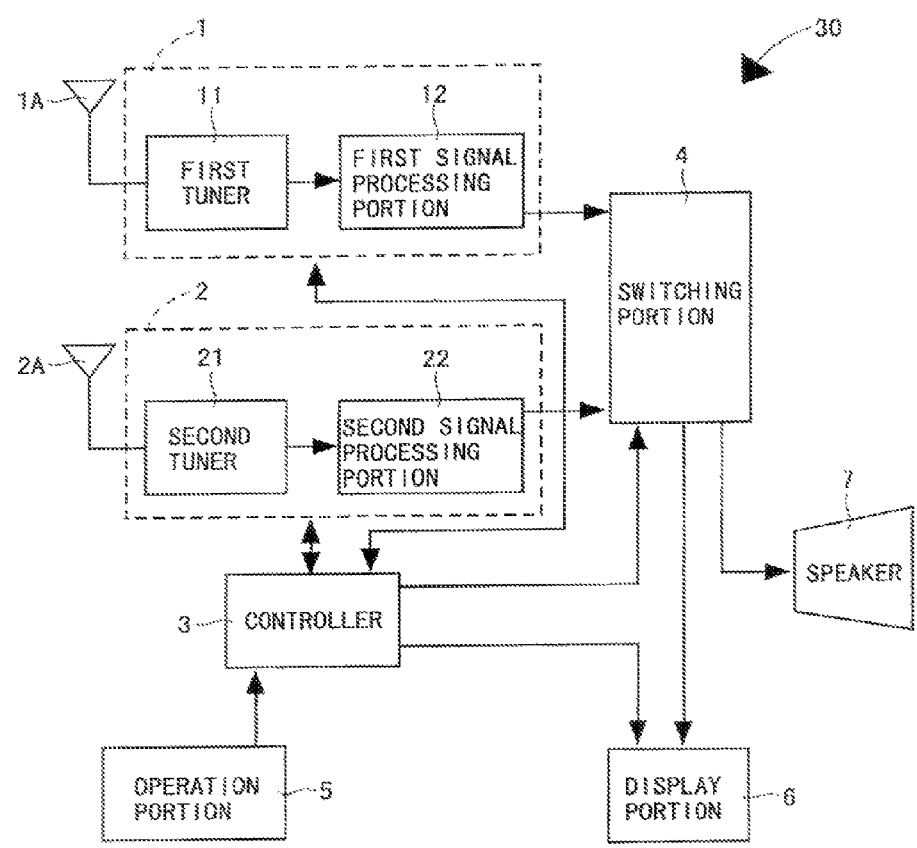
FIG. 1 is a block diagram showing a configuration of a radio wave receiving apparatus of an embodiment of the present invention.

FIG. 1 is a block diagram showing a configuration of a radio wave receiving apparatus 1 of this embodiment. Although FIG. 1 shows a configuration in which a first antenna 1A and a second antenna 2A are provided, it may be configured such that one antenna commonly used for two radio waves is provided. A first radio wave processing portion 1 is formed of a first tuner 11 and a first signal processing portion 12. In addition, a second radio wave processing portion 2 is formed of a second tuner 21 and a second signal processing portion 22. Each radio wave processing portion 1, 2 receives a radio wave, and outputs various kinds of information such as video information (video signal, video data), audio information (audio signal, audio data), and another information (location information, etc). In this embodiment, the radio wave may mean a portable telephone-use radio wave, a PHS-use radio wave, a transceiver-use radio wave, an analog radio broadcasting radio wave, a digital radio broadcasting radio wave, an analog TV broadcasting radio wave, a digital TV broadcasting (e.g., CS broadcasting, BS broadcasting, a terrestrial digital broadcasting) radio wave, a GPS (global positioning system)-use radio wave, a wireless LAN-use radio wave, etc.

A switching portion 4 inputs output signals of the first and second radio wave processing portions 1, 2, selects the output signals according to a switching instruction from a controller 3, and applies a selected signal to a display portion (a liquid crystal panel, etc., for example) 6 or a speaker 7. Hereinafter, an operation state in which the signal output from the first radio wave processing portion 1 is a subject to be processed is referred to as a first operation mode, and an operation state in which the signal output from the second radio wave processing portion 2 is a subject to be processed is referred to as a second operation mode.

Figure 2:
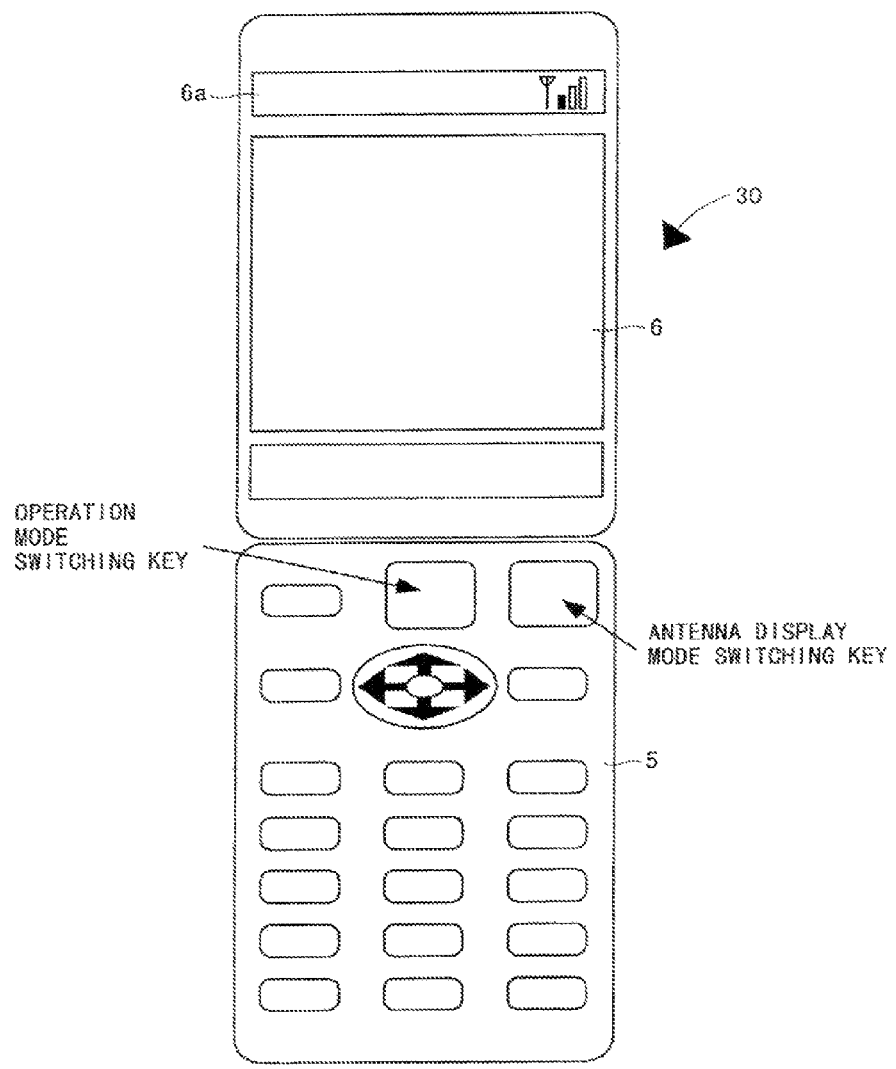
FIG. 2 is a plan view showing an outline of the radio wave receiving apparatus of an embodiment of the present invention.

As shown in FIG. 2, an operating portion 5 is provided with various kinds of keys. In this embodiment, an "operation mode switching" key and an "antenna display mode switching" key are provided. The operation mode switching is to switch between the above-described first operation mode and the second operation mode, and the controller 3 executes a mode switching process (controlling of the switching portion 4, and so forth) as a result of detecting that the keys are operated. The antenna display mode switching will be described later.

In addition to an entire control in the radio wave receiving apparatus, the controller 3 executes a process for visibly displaying intensity of a received radio wave as described below as the control described in the present invention. The controller 3 obtains from each tuner 11, 21 a voltage value indicating the intensity of the received radio waves (electric fields intensity of received radio) so as to carry out a comparing process among a first threshold value, a second threshold value, and a third threshold value, for example. When the power voltage value is larger than the first threshold value, the controller 3 determines that the received radio wave is "strong", when the power voltage value is larger than the second threshold value and smaller than the first threshold value, the controller 3 determines that the received radio wave is "middle", when the power voltage value is larger than the third threshold value and smaller than the second threshold value, the controller 3 determines that the received radio wave is "weak", and when the power voltage value is smaller than the third threshold value, the controller 3 determines that the radio wave travels "out of range". This determination process is executed at certain intervals. In addition, based on a result of the above-described determination process, the controller 3 generates a segment ON signal. In the display portion 6, as shown in FIG. 2, a received radio wave intensity display portion 6a formed of liquid crystal is provided. The received radio wave intensity display portion 6a is formed of an inverted triangle segment representing an antenna, and three bar-shaped segments each of which differs in height. When it is determined that the received radio wave is "strong", the controller 3 applies to the received radio wave intensity display portion 6a a signal for turning on the three bar-shaped segments. Similarly, when it is determined that the received radio wave is "middle", the controller 3 applies to the received radio wave intensity display portion 6a a signal for turning on the two bar-shaped segments, and when it is determined that the received radio wave is "weak", the controller 3 applies to the received radio wave intensity display portion 6a a signal for turning on the one bar-shaped segment.

Figure 3:
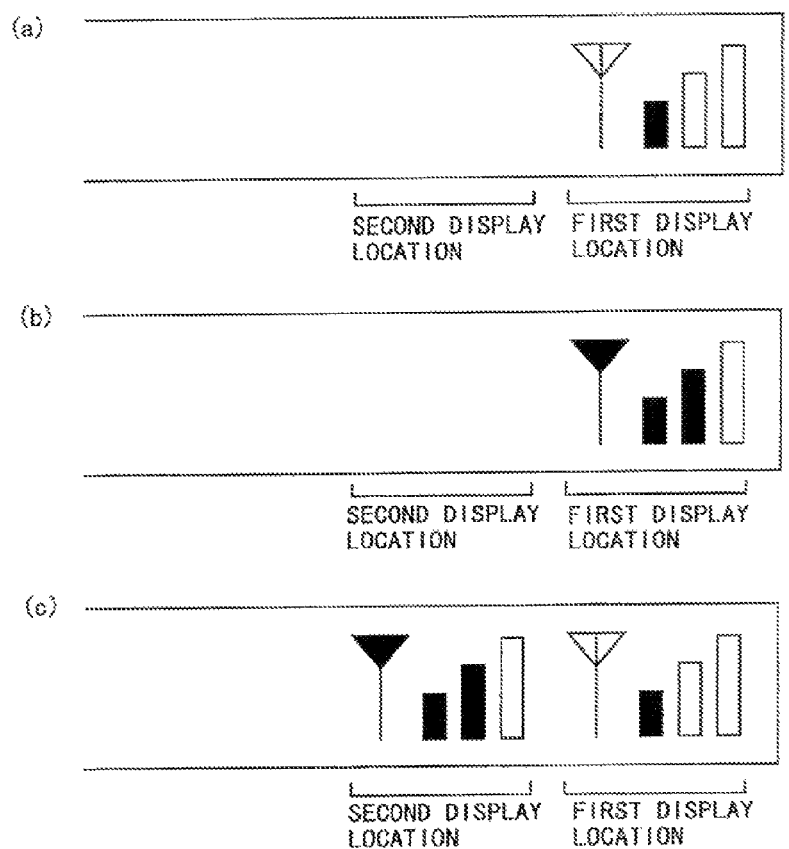

In FIG. 3, display manners in each display mode in the received radio wave intensity display portion 6a are shown. A first display mode shown in a portion (a) in FIG. 3 is a mode for showing in a first display location the intensity of the received radio wave of the tuner in use (, which refers to the first tuner 11 in the first operation mode, and to the second tuner 21 in the second operation mode), a second display mode shown in a portion (b) in FIG. 3 is a mode for showing in the first display location the intensity of the received radio wave of the tuner not in use (, which refers to the second tuner 21 in the first operation mode, and to the first tuner 11 in the second operation mode), and a third display mode shown in a portion (c) in FIG. 3 is a mode for showing in the first display location the intensity of the received radio wave of the tuner in use and in a second display location the intensity of the received radio wave of the tuner not in use. The controller 3 detects an operation of the "antenna display mode switching" key, and switches the display modes one after the other. It is noted that in the above example, it is attempted to distinguish between the first display mode and the second display mode by changing colors (by turning on/off the liquid crystal display) of the inverted triangle-shaped segment in the first display location. However, in addition thereto, it is also possible to attempt to distinguish the two display modes according to a difference in shape of the segment, that is, a triangle-shaped segment that is turned on and off is provided, and the two display modes are distinguished as a result of the shape of the segment being rendered different.

Next, a process for displaying the intensity of the received radio waves in the tuners 11, 21 will be described based on flowcharts from FIG. 4 to FIG. 8.

When a power supply is turned on, the controller 3 carries out initializing processes such as clearing a memory (not shown), initializing the first and second radio wave processing portions 1, 2, and the display portion 6 (step S1). Then, the controller 3 causes each tuner 11, 21 to execute radio wave receiving processes (step S2), and in addition, causes each signal processing portion 12, 22 to execute signal processes (step S3). As a result of such the processes, a radio wave of a certain frequency is received, and a demodulating process (regarding a digitally modulated signal, a further decoding process, etc., are carried out), etc., are executed. As a consequence, a content transmitted by the radio wave is retrieved, and as a result, a video display and an audio output are carried out.

The controller 3 sets an operation mode to the first operation mode (step S4), and sets an antenna display mode to the first antenna display mode (step S5). Then, the controller 3 applies a switch instruction to the switching portion 4 so as to allow the switching portion 4 to form a signal outputting state corresponding to the operation mode (step S6). It is noted that in the first operation mode, an output of the first radio wave processing portion 1 is to be selected in the switching portion 4, and in the second operation mode, an output of the second radio wave processing portion 2 is to be selected in the switching portion 4. Furthermore, the controller 3 carries out according to the antenna display mode a determination process of the intensity of the received radio waves in the first or second tuner, or in the both tuners, and outputs the segment ON signal to the received radio wave intensity display portion 6a based on the determination result (step S7).

In addition, the controller 3 observes a signal from a key inputting portion 5 (step S8), and in a case that there is no key input (NO in a step S9), the controller 3 determines whether or not a previously set determination time-period interval of the intensity of the received radio wave (antenna level) elapses (step S10). When it is determined that the determination time-period interval elapses, the controller 3 returns to the step S7 so as to display the antenna level once again. When it is determined that the determination time-period interval of the antenna level has not elapsed, the controller 3 returns to the step S8 so as to observe whether or not there is a new key input.

On the other hand, in a case that there is the key input (YES in the step S9), the controller 3 carries out a determination for understanding what kinds of the keys are input (step S12). In a case that the input key is the antenna display mode switching key, the controller 3 carries out a process for adding one to a state value in the antenna display mode (step S13). The controller 3 sets the antenna display mode based on this adding result, and returns to the step S7. It is noted the state values as a result of the addition are within a range of 0, 1, 2, and when the state values as a result of the addition is equal to or more than 3, the state value is converted into 0 (zero). It is noted that the state value 0 (zero) indicates the first antenna display mode, the state value 1 indicates the second antenna display mode, and the state value 2 indicates the third antenna display mode. When the key input in the step S12 is the operation mode switching key, the controller 3 determines whether or not a current operation mode is the first operation mode (step S16). When the current operation mode is the first operation mode, the controller 3 sets the operation mode to the second operation mode (step S17). When the current operation mode is the second operation mode, the controller 3 sets the operation mode to the first operation mode (step S18), and returns to the step S6. In addition, when the key input in the step S12 is neither the antenna display mode switching key nor the operation mode switching key, the controller 3 carries out a process corresponding to the input key (step S19), and returns to the step S8.

FIG. 6 to FIG. 8 are flowcharts showing an antenna level display process in the step S7 in FIG. 4. The controller 3 determines whether or not the antenna display mode is the first display mode (step S21), and when the antenna display mode is the first antenna display mode, the controller 3 determines the current operation mode (step S22). When it is determined that the current operation mode is the first operation mode, the controller 3 carries out a determination process of the intensity of the received radio wave of the first tuner 11 (step S23), and when it is determined that the current operation mode is the second operation mode, the controller 3 carries out a determination process of the intensity of the received radio wave of the second tuner 21 (step S24). Furthermore, the controller 3 sets a color of an icon (segment) in an antenna shape in the first display location of the received radio wave intensity display portion 6a to a first color (see the portion (*a*) in FIG. 3), and applies to the received radio wave intensity display portion 6a the segment ON signal based on the determination result (step S25).

On the other hand, when it is determined that the antenna display mode is not the first display mode in the step S21, the controller 3 determines whether or not the antenna display mode is the second antenna display mode (step S26), and when it is determined that the antenna display mode is the second antenna display mode, the controller 3 determines the current operation mode (step S27). When it is determined that the current operation mode is the first operation mode, the controller 3 carries out a determination process of the intensity of the received radio wave of the second tuner 21 (step S28), and when it is determined that the current operation mode is the second operation mode, the controller 3 carries out a determination process of the intensity of the received radio wave of the first tuner 11 (step S29). Then, the controller 3 sets the color of the icon in an antenna shape in the first display location of the received radio wave intensity display portion 6a to a second color (see the portion (*b*) in FIG. 3), and applies to the received radio wave intensity display portion 6a the segment ON signal based on the determination result (step S30).

In addition, when it is determined that the antenna display mode is not the second display mode in the step S26, the controller 3 determines the current operation mode (step S31). When it is determined that the current operation mode is the first operation mode, the controller 3 carries out a determination process of the intensity of the received radio wave of the first tuner 11 (step S32), and when it is determined that the current operation mode is the second operation mode, the controller 3 carries out a determination process of the intensity of the received radio wave of the second tuner (step S33). Then, the controller 3 sets the color of the icon in an antenna shape in the first display location of the received radio wave intensity display portion 6a to the first color (see the portion (*c*) in FIG. 3), and applies to the received radio wave intensity display portion 6a the segment ON signal based on the determination result (step S34). Furthermore, the current operation mode is determined (step S35), and when it is determined that the current operation mode is the first operation mode, the controller 3 carries out a determination process of the intensity of the received radio wave of the second tuner (step S36), and when it is determined that the current operation mode is the second operation mode, the controller 3 carries out a determination process of the intensity of the received radio wave of the first tuner (step S37). Then, the controller 3 sets the color of the icon in an antenna shape in the second display location of the received radio wave intensity display portion 6a to the second color (see the portion (c) in FIG. 3), and applies to the received radio wave intensity display portion 6a the segment ON signal based on the determination result (step S38).

As described above, according to this embodiment, it is possible for a user to know the intensity of the preferred received radio wave, whether the received radio wave is a subject to be processed or a subject not to be processed. In addition, it is also possible for the user to know at the same time the intensity of the both received radio waves.

What is claimed is:

1. A radio wave receiving apparatus capable of receiving two different radio waves, comprising:
   a display configured to:
   display a first graphic symbol indicating a first intensity of a first radio wave: and
   display a second graphic symbol indicating a second intensity of a second radio wave, wherein the second radio wave has a different radio wave frequency than a radio wave frequency of the first radio wave;
   a mode selection key configured to select a first mode in which both the first and second graphic elements are simultaneously displayed on the display; and
   a controller configured to control the display in response to a user operating the mode selection key, wherein, in the first mode, the first graphic symbol is different in shape from the second graphic symbol, wherein the mode selection key is further configured to select a second mode in which only the intensity of the first radio wave is displayed on the display, and wherein the controller is configured to switch between the first and second modes in response to the user operating the mode selection key, the first graphic symbol comprises at least one first sub-symbol indicating a first intensity level, and at least one second sub-symbol indicating a second intensity level greater than the first intensity level, and wherein the first intensity of the first radio wave is equal or greater than the first intensity level and less than the second intensity level.

2. The apparatus of claim 1, wherein the display indicates the intensity of the first radio wave in at least a first color and indicates the intensity of the second radio wave in at least a second color, different from the first color.

3. The apparatus of claim 1, wherein the first radio wave is currently being processed by the radio wave receiving apparatus and the second radio wave is not currently being processed by the radio wave receiving apparatus.

4. A method of receiving at least two different radio waves using a portable communication device, comprising:
   obtaining information indicating intensities of first and second received radio waves, wherein the second radio wave has a different radio wave frequency than a radio wave frequency of the first radio wave;
   receiving a user input selecting a first mode, wherein, in the first mode, a first graphic symbol is simultaneously displayed with a second graphic symbol on a display of the portable communication device, the first graphic symbol comprising at least one first sub-symbol indicating a first intensity level and at least one second sub-symbol indicating a second intensity level greater than the first intensity level, and the second graphic symbol indicating an intensity of the second radio wave, and wherein the first graphic symbol is different in shape from the second graphic symbol; and
   switching the display, in response to a user input, from the first mode to a second mode, wherein, in the second mode, only the intensity of the first radio wave is displayed on the display and wherein a first intensity of the first received radio wave is equal or greater than the first intensity level and less than the second intensity level.

5. The method of claim 4, wherein the first and second graphic symbols are displayed in different colors on the display.

6. A radio wave receiving apparatus capable of receiving two different radio waves, comprising:
   a display configured to:
   display a first graphic symbol indicating a first intensity of a first radio wave: and
   display a second graphic symbol indicating a second intensity of a second radio wave, wherein the second radio wave has a different radio wave frequency than a radio wave frequency of the first radio wave;
   a mode selection key configured to select a first mode in which both the first and second graphic elements are simultaneously displayed on the display; and
   a controller configured to control the display in response to a user operating the mode selection key, wherein, in the first mode, the first graphic symbol is different in color from the second graphic symbol, wherein the mode selection key is further configured to select a second mode in which only the intensity of the first radio wave is displayed on the display, and wherein the controller is configured to switch between the first and second modes in response to the user operating the mode selection key, the first graphic symbol comprises at least one first sub-symbol indicating a first intensity level, and at least one second sub-symbol indicating a second intensity level greater than the first intensity level, and wherein the first intensity of the first radio wave is equal to or greater than the first intensity level and less than the second intensity level.

7. The apparatus of claim 6, wherein the first graphic symbol is different in shape than the second graphic symbol.

8. The apparatus of claim 6, wherein the first radio wave is currently being processed by the radio wave receiving apparatus and the second radio wave is not currently being processed by the radio wave receiving apparatus.

* * * * *